United States Patent Office 2,936,324
Patented May 10, 1960

2,936,324

PREPARATION OF 2,2,4,4-TETRAALKYLCYCLO-BUTANE-1,3-DIOLS

Robert H. Hasek and Edward U. Elam, Kingsport, Tenn., assignors to Eastman Kodak Company, Rochester, N.Y., a corporation of New Jersey No Drawing. Application April 14, 1958
Serial No. 728,083

10 Claims. (Cl. 260—617)

This invention relates to the hydrogenation of cyclic diones to the corresponding cyclic diols, and more specifically to the hydrogenation of 2,2,4,4-tetraalkylcyclobutane-1,3-diones to the corresponding 2,2,4,4-tetraalkylcyclobutane-1,3-diols.

The catalytic hydrogenation of acyclic 1,3-diones over Raney nickel was studied rather extensively by Sprague and Adkins (J. Am. Chem. Soc. 56, 2669 (1934)). These workers reported results on the hydrogenation of a wide variety of diones. Of those studied, only one gave a diol in over 80% yield; yields of most of the diols reported were much lower, and some were below 20%. Cleavage to monoketones and monoalcohols was the major side reaction. The extent of this side reaction varied somewhat with reaction conditions, but it was always appreciable.

The hydrogenation of 2,2,4,4-tetramethylcyclobutane-1,3-dione over Raney nickel catalyst was reported by Leon L. Miller (Ph. D. Thesis, Cornell University, 1937). The expected 2,2,4,4-tetramethylcyclobutane-1,3-diol was obtained, but in low yield and contaminated by a high-boiling, oily byproduct. We have corroborated his results, and have also found that inferior yields and undesirable byproducts are obtained when 2,2,4,4-tetramethylcyclobutane-1,3-dione is hydrogenated over Raney nickel and other traditional and commonly used hydrogenation catalysts such as copper chromite, nickel-kieselguhr, palladium, rhodium, platinum, and the like.

It is an object of this invention to provide an improved method for hydrogenating 2,2,4,4-tetraalkylcyclobutane-1,3-diones to 2,2,4,4-tetraalkylcyclobutane-1,3-diols.

It is another object of this invention to provide an improved method for hydrogenating 2,2,4,4-tetraalkylcyclobutane-1,3-diones to 2,2,4,4-tetraalkylcyclobutane-1,3-diols in higher yields than result by effecting this hydrogenation with previously employed hydrogenating catalysts.

It is still another object of this invention to reduce 2,2,4,4-tetraalkylcyclobutane-1,3-diones to 2,2,4,4-tetraalkylcyclobutane-1,3-diols by an improved process which is characterized by the formation of substantially no reaction byproducts.

These and other objects of the invention are accomplished by hydrogenating 2,2,4,4-tetraalkylcyclobutane-1,3-diones to 2,2,4,4-tetraalkylcyclobutane-1,3-diols in the presence of a hydrogenation catalyst containing ruthenium. The reaction of the invention can be represented by the following equation:

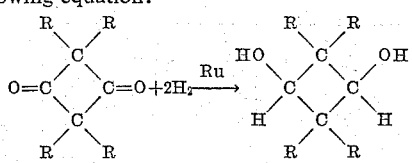

wherein R is an alkyl radical, and preferably a lower alkyl radical containing 1 to 8 carbon atoms. The alkyl radicals need not be the same on the 2,2,4,4-tetraalkylcyclobutane-1,3-diones reduced in accordance with the invention, such compounds as 2,4-dimethyl-2,4-diethylcyclobutane-1,3-dione and the like being included in the invention. Other 2,2,4,4-tetraalkylcyclobutane-1,3-diones that can be suitably reduced to the corresponding diols include such 2,2,4,4-tetraalkyl diones as the 2,2,4,4-tetramethyl dione, the 2,2,4,4-tetraethyl dione, the 2,2,4,4-tetra-n-propyl dione, the 2,2,4,4-tetra-n-butyl dione, the 2,2,4,4-tetra-n-amyl dione, the 2,2,4,4,-tetra-n-hexyl dione, the 2,2,4,4-tetra-n-heptyl dione, the 2,2,4,4-tetra-n-octyl dione, the 2,2-dimethyl-4,4-diethyl dione, the 2-ethyl-2,4,4-trimethyl dione etc.

The ruthenium catalyst can be present initially either as the metal or as a compound, such as the oxide, which is readily reduced to the metal or elemental form under the conditions of the reaction. The actual physical state of the catalyst can be widely varied as long as it presents a large active surface to the reaction medium. Suitable catalysts are, for example: colloidal ruthenium; powdered ruthenium or powdered ruthenium oxide; ruthenium metal supported on powdered activated carbon, alumina, or silica; or ruthenium metal supported on pellets, granules, or extrusions of alumina, carbon, silica, etc. In general, a powdered catalyst would be used if the reaction were carried out batchwise in an autoclave and pelleted or granular catalysts would be used for continuous operation in a tower packed with catalyst.

The amount of ruthenium used to catalyze the reaction can be widely varied. In a batchwise operation the catalyst is usually varied from about 0.01% to 5% based on the weight of the 2,2,4,4-tetraalkylcyclobutane-1,3-dione reduced. In a continuous operation in a tower packed with supported catalysts the ratio of catalyst to the 2,2,4,4-tetraalkylcyclobutane-1,3-dione reactant, of course, is very much higher.

With regard to suitable reaction conditions under which the subject ruthenium catalysts can be employed, temperatures of at least 0° C. are used, with elevated temperatures from about 30° C. up to about 200° C. being more generally used and with temperatures of 75 to 150° C. being preferably used. The hydrogen pressure used in the subject reaction can also be varied over a wide range, with elevated pressures up to about 500 atmospheres being suitable, and pressures from about 50 to 200 atmospheres being preferred. The subject hydrogenation is carried out until substantially all of the dione in the reaction mixture is reduced, this point being determined when no more hydrogen is consumed in the reaction.

A solvent substantially inert to the hydrogenation reaction can be employed if desired, although it is not necessary. Such substantially inert solvents as lower alkanoic alcohols and hydrocarbons, are typically used. Illustrative examples include methanol, ethanol, cyclohexane, n-heptane and the like. The use of these solvents moderates the reaction as well as facilitates the handling of the reaction product.

The product of the subject reaction is characterized as being of high purity and generally requires a minimum of "working up" or purifying, although conventional purification methods can be employed on the reaction product of the invention. If a solvent is utilized in the reaction, the solvent can be readily removed from the reaction mixture by evaporation or distillation, and in a batch operation, the catalyst can be readily removed by filtration.

The action of the subject ruthenium catalyst is specific in the reduction of 2,2,4,4-tetraalkylcyclobutane-1,3-diones to 2,2,4,4-tetraalkylcyclobutane-1,3-diols, the formation of substantially no by products resulting during the course of this reduction reaction. Yields of 90 to 95% and higher are commonly obtained with the subject process. Such results are in sharp contrast to those obtained with the usual hydrogenation catalysts, including catalysts closely related to the subject ruthenium catalyst. Additionally, the rate of hydrogenation of 2,2,4,4-tetraalkylcyclobutane-1,3-diones to 2,2,4,4-tetraalkylcyclobutane-1,3-diols is fast with the subject ruthenium catalyst, and the hydrogenating can be effected at lower temperatures and pressures than those used with other hydrogenation catalysts. The reaction product of a typical batch hydrogenation in the presence of a ruthenium catalyst, of 2,2,4,4-tetramethylcyclobutane-1,3-dione, for example, after removal of the catalyst by filtration and the solvent by evaporation, is crystalline 2,2,4,4 - tetramethylcyclobutane - 1,3 - diol substantially equivalent in purity to a sample of 2,2,4,4-tetramethylcyclobutane-1,3-diol carefully purified by recrystallization. When 2,2,4,4-tetramethylcyclobutane-1,3-dione is subjected to hydrogenation over the usual hydrogenation catalysts, the resulting reaction product is at best a lower melting solid due to contamination by liquid byproducts.

The subject 2,2,4,4-tetraalkylcyclobutane-1,3-diols can be used in the preparation of esters and polyesters which have useful properties. Esters of certain monocarboxylic acids have the high boiling points and flash points, favorable temperature-viscosity characteristics, high thermal stability and related properties which are required for special hydraulic fluids and lubricants, typical of such materials being 2,2,4,4-tetramethylcyclobutane-1,3-diol dipelargonate. Polyesters of the 2,2,4,4-tetraalkylcyclobutane-1,3-diols are useful as plasticizers, plastics, films and fibers. In all cases, the high thermal stability and resistance to hydrolytic degradation of such esters are desirable properties.

The invention is illustrated by the following examples of preferred embodiments thereof.

EXAMPLE 1

A mixture of 400 g. of 2,2,4,4-tetramethylcyclobutane-1,3-dione, 600 ml. of methanol, and 20 g. of 5% ruthenium on carbon powder was placed in a 1780 ml. stainless steel rocking autoclave. The autoclave was purged with hydrogen, charged to 1000 p.s.i. with hydrogen, and heated to 125° C. Hydrogen was absorbed rapidly during the heating period, and the reaction was complete in about an hour. The resulting homogeneous product was removed from the autoclave, filtered from the ruthenium catalyst, and evaporated to dryness. The yield of a mixture of cis- and trans-2,2,4,4-tetramethylcyclobutane-1,3-diol melting from 129° C. to 150° C. was 403 g. (97.8%). Infrared analysis indicated that the reaction product was substantially pure 2,2,4,4-tetramethylcyclobutane-1,3-diol.

EXAMPLE 2

A solution of 50 g. of 2,2,4,4-tetramethylcyclobutane-1,3-dione in 100 ml. of methanol was hydrogenated over 10 g. of 5% ruthenium on carbon powder at a temperature of 125° C. and at a pressure of 1500 p.s.i. as described in Example 1. Hydrogenation was complete in about 30 minutes. The crude product was removed from the autoclave, filtered and evaporated to dryness. The yield of 2,2,4,4-tetramethylcyclobutane-1,3-diol was 48.5 g. (94.1%). The infrared spectrum indicated that the reaction product was substantially pure 2,2,4,4-tetramethylcyclobutane-1,3-diol and that no carbonyl compound was present.

EXAMPLE 3

A mixture of 100 g. of 2,2,4,4-tetraethylcyclobutane-1,3-dione, 250 ml. of methanol and 20 g. of 5% ruthenium on charcoal was placed in a stainless steel rocking autoclave. The autoclave was purged with hydrogen, charged to 1500 p.s.i. with hydrogen and heated to 125° C. The hydrogen uptake was rapid and the reaction was over in less than 45 minutes. The autoclave was cooled, vented, the contents filtered and the filtrate evaporated to dryness. The residue was comprised of a mixture of cis- and trans-2,2,4,4-tetraethylcyclobutane-1,3-diol melting from 106° C. to 116° C. The yield was 100.5 g. (98.3%). This reaction product was recrystallized from benzene to give a product with the following analysis:

Percent C (calculated for $C_{12}H_{24}O_2$)=72.0, percent C (found)=71.78

Percent H (calculated for $C_{12}H_{24}O_2$)=12.0, percent H (found)=11.94

EXAMPLE 4

Fifty grams of 2,4-diethyl-2,4-dimethylcyclobutane-1,3-dione were reduced over 5% ruthenium on carbon powder as described in Example 2. The yield of mixed cis and trans isomers of 2,4-diethyl-2,4-dimethylcyclobutane-1,3-diol boiling from 110–116° C. at 5 mm. was 92%.

EXAMPLE 5

The procedure of Example 1 was repeated, except that 5% ruthenium on powdered alumina was used as the catalyst. Hydrogenation was continued for five hours. The product was removed from the autoclave, filtered, and evaporated to dryness. The solid residue weighed 392 g. (95% yield), melted at 129 to 137° C. and gave the infrared absorption spectrum of substantially pure 2,2,4,4 - tetramethylcyclobutane - 1,3 - diol without further purification.

To illustrate the superiority of ruthenium as a catalyst in the reduction of 2,2,4,4-tetraalkylcyclobutane-1,3-diones to 2,2,4,4-tetraalkylcyclobutane-1,3-diols, several well known hydrogenation catalysts were tested in this reaction, the comparative data being set out in Example 6 below:

EXAMPLE 6

Several samples of 2,2,4,4-tetramethylcyclobutane-1,3-dione were hydrogenated in methanol in a 1780 ml. stainless steel rocking autoclave under the conditions described in the table below. The methanol was removed from the reaction product by evaporation and the catalysts were removed by filtration. For convenience the terms "dione" and "diol" used in this example refer to 2,2,4,4-tetramethylcyclobutane-1,3-dione and 2,2,4,4-tetramethylcyclobutane-1,3-diol respectively.

*Table*

| Catalyst | Catalyst, g. | Dione, g. | Methanol, ml. | Pressure, p.s.i. | Temperature, °C. | Time, Hours | Diol Yield, Percent |
|---|---|---|---|---|---|---|---|
| (a) Raney nickel | 20 | 285 | 400 | 1,500 | 150 | 24 | 0 |
| (b) Raney nickel | 50 | 228 | 400 | 1,500 | 150 | 5 | 15.1 |
| (c) Nickel-kieselguhr | 15 | 100 | 100 | 3,000 | 150 | 3 | 63 |
| (d) Copper Chromite | 25 | 50 | 100 | 3,000 | 150 | 2 | 68 |
| (e) 5% Palladium on alumina | 20 | 100 | 100 | 2,500 | 100 | 1.5 | 0 |
| (f) 5% Palladium on alumina | 20 | 100 | 100 | 1,500 | 150 | 3 | 0 |
| (g) Platinum dioxide | 1 | 50 | 100 | 2,500 | 150 | 4.1 | 15.5 |
| (h) 5% Platinum on alumina | 10 | 50 | 100 | 2,500 | 150 | 5.0 | 0 |
| (i) 5% Rhodium on alumina | 10 | 50 | 100 | 2,500 | 150 | 2.5 | 0 |

With reference to hydrogenation reactions (a) to (i) summarized in the above table: the product of reaction (a), after removal of the methanol, was liquid; although the hydrogenation of reaction (b) was stopped before absorption of hydrogen had ceased, no unreduced dione could be isolated from the reaction product, the reaction product having a melting point of 107–114° C.; the product of reactions (c) and (d), after removal of the methanol, were soft and oily; much unreduced dione was recovered in the reaction product of reactions (e) and (f); the reaction product of reaction (g), after removal of the methanol, was cooled and solid material was filtered therefrom which had a melting point of 65–148° C. and is listed in the above table under diol yield; the reaction product of reaction (h), after removal of the methanol, weighed 25 g. and was a liquid which gave a positive carbonyl test with ethanolic 2,4-dinitrophenylhydrazine; and the reaction product of reaction (i), after removal of the methanol, weighed 32.1 g. and was a liquid which on cooling formed some crystals which were identified as unreduced dione by a mixed melting point determination.

As is illustrated by the data summarized in the above table, when conventional hydrogenation catalysts are employed in the hydrogenation of 2,2,4,4-tetraalkylcyclobutane-1,3-diones to the corresponding diols, yields of the diols are low and the reaction product is contaminated with substantial amounts of byproducts. However, we have found that ruthenium is unexpectedly an efficient and a specific catalyst for the subject hydrogenation reaction, the use of the ruthenium catalyst resulting in unusually high yields of diol of particularly high purity.

Although the invention has been described in considerable detail with reference to certain preferred embodiments thereof, it will be understood that variations and modifications can be effected within the spirit and scope of the invention as described hereinabove and as defined in the appended claims.

We claim:

1. In the preparation of 2,2,4,4-tetraalkylcyclobutane-1,3-diols by hydrogenating the corresponding 2,2,4,4-tetraalkylcyclobutane-1,3-dione, the improvement which comprises effecting the said hydrogenation in the presence of hydrogenation catalyst consisting essentially of elemental ruthenium.

2. The process for preparing cyclic diols which comprises hydrogenating a compound of the formula:

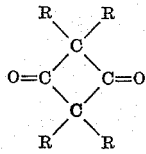

wherein R is a lower alkyl radical containing 1 to 8 carbon atoms, said hydrogenation being carried out at an elevated temperature up to about 200° C. and at an elevated pressure up to about 500 atmospheres in the presence of a hydrogenation catalyst consisting essentially of elemental ruthenium.

3. The process according to claim 2 wherein the lower alkyl radical is selected from the group consisting of methyl and ethyl radicals.

4. The process of hydrogenating 2,2,4,4-tetramethylcyclobutane-1,3-dione to 2,2,4,4-tetramethylcyclobutane-1,3-diol which comprises effecting the said hydrogenation at a temperature of 75 to 150° C. and at a pressure of 50 to 200 atmospheres in the presence of a hydrogenation catalyst consisting essentially of elemental ruthenium.

5. The process of hydrogenating 2,2,4,4-tetraethylcyclobutane-1,3-dione to 2,2,4,4-tetraethylcyclobutane-1,3-diol which comprises effecting the said hydrogenation at a temperature of 75 to 150° C. and at a pressure of 50 to 200 atmospheres in the presence of a hydrogenation catalyst consisting essentially of elemental ruthenium.

6. The process of hydrogenating 2,4-dimethyl-2,4-diethylcyclobutane-1,3-dione to 2,4-dimethyl-2,4-diethylcyclobutane-1,3-diol which comprises effecting the said hydrogenation at a temperature of 75 to 150° C. and at a pressure of 50 to 200 atmospheres in the presence of a hydrogenation catalyst consisting essentially of elemental ruthenium.

7. The process for hydrogenating a cyclobutane-1,3-dione having the following formula:

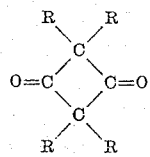

wherein R is a lower alkyl radical containing 1 to 8 carbon atoms to the corresponding cyclobutane-1,3-diol, which comprises effecting said hydrogenation in a methanolic reaction medium in the presence of a hydrogenation catalyst consisting essentially of elemental ruthenium on powdered carbon at a temperature of 75 to 150° C. and at a pressure of 50 to 200 atmospheres.

8. The process according to claim 7 wherein the lower alkyl radical is selected from the group consisting of methyl and ethyl radicals.

9. The process for hydrogenating a cyclobutane-1,3-dione having the following formula:

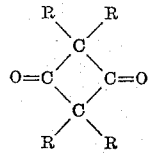

wherein R is a lower alkyl radical containing 1 to 8 carbon atoms to the corresponding cyclobutane-1,3-diol, which comprises effecting said hydrogenation in a methanolic reaction medium in the presence of a hydrogenation catalyst consisting essentially of elemental ruthenium on powdered alumina at a temperature of 75 to 150° C. and at a pressure of 50 to 200 atmospheres.

10. The process according to claim 9 wherein the lower alkyl radical is a methyl radical.

References Cited in the file of this patent
UNITED STATES PATENTS
2,478,261    Frank _____ Aug. 9, 1949

OTHER REFERENCES

Hill et al.: Jour. Amer. Chem. Soc., vol. 75 (1953), pp. 1084–86.

Cope et al.: Jour. Amer. Chem. Soc., vol. 78 (Nov. 5, 1956), pp. 5599–5600.

Smirnov-Zamkov et al.: Chem. Abstracts, vol. 50 (1956), col. 9302 (1 p.)